Figure 1:
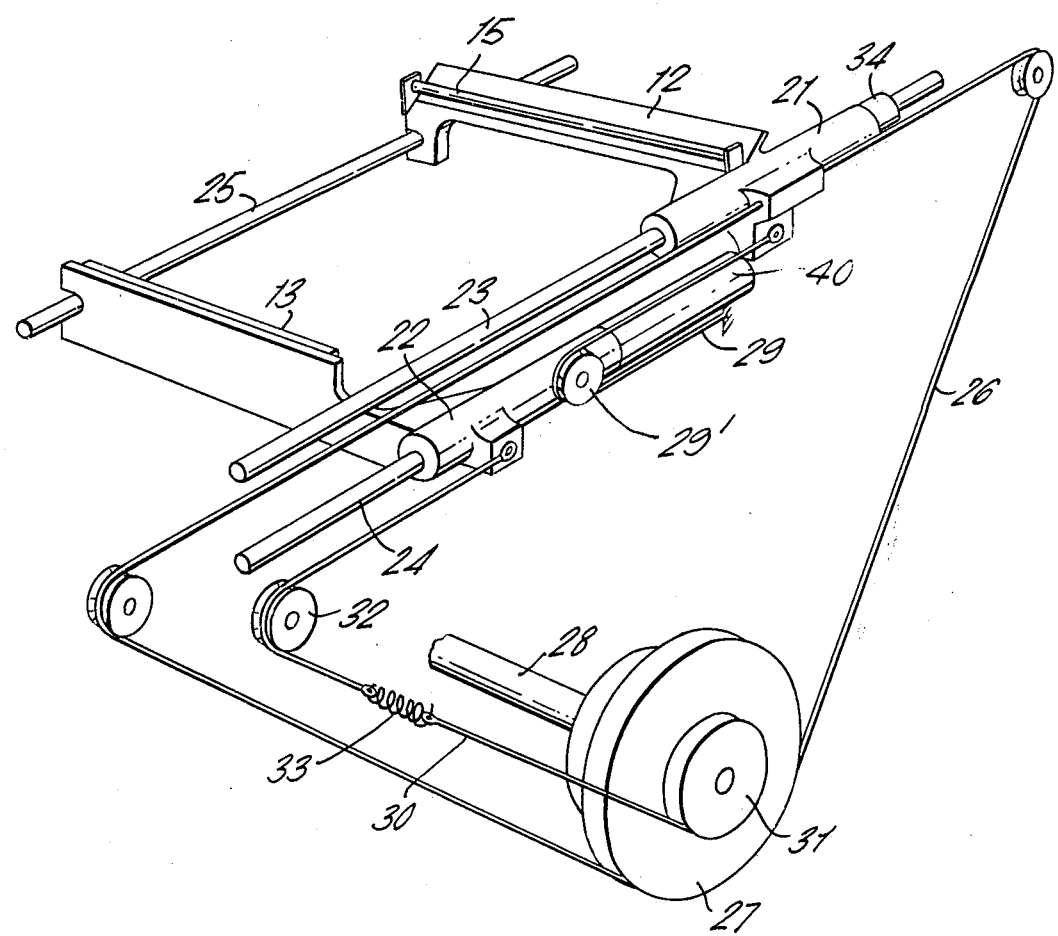

United States Patent [19]
Cook

[11] 3,918,806
[45] Nov. 11, 1975

[54] DASHPOT FOR COPIER OPTICAL SCANNING

[75] Inventor: John H. Cook, Sawbridgeworth, England

[73] Assignee: Xerox Corporation, Stamford, Conn.

[22] Filed: Oct. 15, 1974

[21] Appl. No.: 514,357

[30] Foreign Application Priority Data
Nov. 6, 1973 United Kingdom............. 51439/73

[52] U.S. Cl. .................. 355/8; 355/66; 355/49; 188/297
[51] Int. Cl.² .............. G03G 15/28; G03B 27/50
[58] Field of Search ............. 355/8, 47, 60, 65, 66, 355/84, 81, 57; 188/297

[56] References Cited
UNITED STATES PATENTS
| | | | |
|---|---|---|---|
| 1,488,197 | 3/1924 | Demke et al. | 188/321 X |
| 3,062,109 | 11/1962 | Mayo et al. | 355/8 |

*Primary Examiner*—Robert P. Greiner

[57] ABSTRACT

An optical scanning system for a photocopier wherein an optical scanning carriage is movably mounted on a tubular guide member which provides an integral pneumatic dashpot piston/cylinder. Additional adjustable damping features are disclosed. A dual carriage scanning system is disclosed in which damping of one carriage at one speed also provides damping of a second carriage at a second speed.

10 Claims, 4 Drawing Figures

DASHPOT FOR COPIER OPTICAL SCANNING

This invention relates to a dashpot for use in controlling movement of a carriage, particularly a carriage of a document scanning system of a photocopying machine. The invention also relates to carriage drive assemblies incorporating such dashpots.

Photocopying machines such as those described in British Pat. Specification No. 995,413 [U.S. Pat. No. 3,062,109] or the Xerox Corporation "3100" copier, include lamps for exposing successive portions of a document to be copied to a photosensitive surface. These lamps, which are carried on a carriage, are scanned slowly across the document and are then quickly returned to their initial position at the end of the scanning stroke. Lamps used for this purpose are, especially when hot, delicate and sensitive to accelerations. One or more scanning carriages may carry scanning mirrors which cannot be jarred from a precise alignment. Normally the carriage is driven in one direction by means of a cable connected to the main drive of the machine through a clutch, and is returned at a much higher speed under the influence of a spring when the clutch is disengaged. At the end of this return stroke the carriage collides with a buffer. Various means have been used to soften the collision, for example, air vanes driven by the movement of the carriage which act as a governor. Another way of softening the collision has been to use a conventional fixed pneumatic dashpot struck by the carriage at the end of its travel as in the "3100" copier.

Hydraulic damping devices have been proposed for various applications, e.g., shock absorbers, in which a piston travels in a cylinder having a plurality of relatively axially disposed apertures in its side wall. With such an arrangement the damping action of the device progressively increases as the piston travels along the cylinder and successively closes off the apertures until finally further travel is prevented when the last aperture is covered. However, while such devices function effectively they tend to be expensive and heavy inter alia due to the necessity for containing a hydraulic liquid at all times, and leakage of the liquid can damage other components. Various hydraulic cylinders or dashpots in general are, of course, well known. Some examples are shown in U.S. Pat. Nos. 1,488,197, 3,207,269, and 3,722,638.

For the application to damping the return movement of a lamp carriage as described above, it is desirable that the carriage still be moving at slow speed when it reaches the buffer to ensure that friction or some other factor does not prevent the carriage from reaching the end of its return stroke. To achieve this a pneumatic dashpot having a single aperture located in its end wall will in many cases provide sufficient deceleration control or damping of the carriage movement. However, where it is desired to reduce the size of the dashpot to a minimum, it is desirable that the piston travel as near to the full length of the cylinder as possible and with such an arrangement a sufficient volume must be provided in the cylinder beyond the piston at the end of its damping stroke to ensure that the dashpot is still effective to damp the movement of the carriage at the end of its stroke. (Thus, as this volume approaches zero, so the damping effect of the dashpot approaches zero.)

In our copending U.K. Pat. application No. 15565/73, filed on 30 Mar. 1973, (R/0273) there is described a pneumatic dashpot for retarding movement of a carriage towards an end position induced by a drive means, said dashpot including a cylinder and a piston movable in said cylinder to an end position corresponding to said end position of the carriage, and a plurality of relatively axially disposed apertures, at least one of which is arranged beyond said end position of the piston. With such construction, the damping action of the dashpot increases as successive apertures are covered by the piston, until all apertures save the last one have been closed, whereafter constant damping is provided until the end of the rescan stroke. By suitable choice of the size and/or number of the apertures the carriage may be decelerated sufficiently to avoid damage to the scanning lamps when the carriage strikes the buffer while the cylinder volume beyond the piston in its end position is small. At the same time it is ensured that the carriage strikes the buffer with a finite velocity since an aperture is arranged beyond the end position of the piston.

In one embodiment described in our aforesaid copending application the dashpot is mounted surrounding a guide rod, bar or like member for the carriage.

This latter arrangement has the advantage of reducing the space taken up by a separate dashpot but, of course, the volume of the dashpot is itself reduced by the guide member about which it is disposed.

From one aspect, the present invention provides a pneumatic dashpot comprising a cylinder and a piston each mounted on a tubular member, one slidably and the other in fixed relation thereto, said tubular member defining a chamber vented to atmosphere by an aperture therein and said cylinder having a closed end wall, a further aperture communicating said cylinder and chamber intermediate said cylinder end wall and said piston, adjacent the one that is fixed.

Said further aperture should preferably be at least as large as the aperture venting the chamber to atmosphere.

A dashpot construction according to this invention ensures that a volume of air sufficient to provide a damping action remains at the end of the damping stroke even though the piston approaches close to the cylinder end wall.

The optical scanning length (carriage movement) is preferably decelerated in as short a distance as possible, since otherwise additional scanning distance must be provided, which increases the copying machine dimension. It could also interfere with platen corner edge book copying capabilities.

From another aspect, the invention provides a carriage drive assembly including means for driving the carriage towards and end position and a pneumatic dashpot as described above, said further aperture being arranged beyond the end position of the piston relative to the cylinder.

The end position of the carriage is conveniently defined by a stop or buffer.

Suitably, the carriage drive means comprises a spring or other biasing means.

Preferably said tubular member comprises a guide or support for the carriage.

The movable one of the piston and cylinder may be connected to the carriage in which case, the cylinder may be open at its other end and the piston may be disposed outside the cylinder when the carriage is remote from its said end position. In this way the dashpot may be so dimensioned that it exerts a damping affect on the carriage immediately the piston enters the cylinder.

In a preferred form, the drive assembly includes means for driving the carriage in the opposite direction, suitably at a controlled speed, in which event, where the movable one of the piston and cylinder and the carriage are unconnected biasing means are provided to return the piston or cylinder to its start position so that it will be effective to dampen the movement of the carriage the next time it is driven towards the end stop.

In one preferred embodiment of the invention, the cylinder is slidably mounted on a tubular guide for the carriage and the piston is fixed on the tubular guide, the closed end of the cylinder being connected to the carriage. Said further aperture is arranged adjacent the piston beyond the end position of the cylinder end wall.

While the use of a said further aperture in the tubular member will in many cases provide sufficient deceleration control or damping of the carriage movement, where the velocity of the carriage is high and controlled deceleration over a short distance is desired, a plurality of relatively axially disposed apertures at least one of which is arranged beyond said end position, may be provided in the wall of the tubular member. Or in addition to said further aperture, a plurality of relatively axially disposed apertures may be provided in the side wall of the cylinder in any of the ways envisaged in our aforesaid copending application.

Preferably, the aperture venting the chamber defined by the tubular member to atmosphere is adjustable.

Particularly where the cylinder is slidably mounted and the piston is fixed, it is desirable, in order to reduce wear and to avoid any alignment difficulties as between the piston and the cylinder, that the piston at all times remain within the cylinder, in which case, in order that the dashpot will only have a damping effect over the latter part of its stroke, the cylinder may be provided with a sufficiently large bleed aperture at a suitable location along its length.

The invention may be applied to a carriage drive assembly including two carriages which are operatively connected but driven at different speeds, only a single dashpot being provided and the operative connection between the two carriages serving to transfer the damping effect from one carriage to the other.

In a document scanning system of photocopying machine, to which the invention has particular application, the lamp(s) are repeatedly scanned across the document slowly and following each scanning stroke the carriage carrying them is quickly returned to its "start-of-scan" position. The return or so-called "rescan" movement of the carriage should desirably take place in a short time while the scanning movement of the carriage is relatively slow. The present invention permits high speed rescan to be achieved while cushioning the scanning system and particularly the lamp(s) from heavy shocks and at the same time ensuring that the end position of the carriage (following rescan) will always be the same, by virtue of the provision of an aperture beyond the end position of the piston.

From a further aspect, the invention provides a photocopying machine having a document scanning system incorporating a carriage drive assembly as described above.

Figure 2:
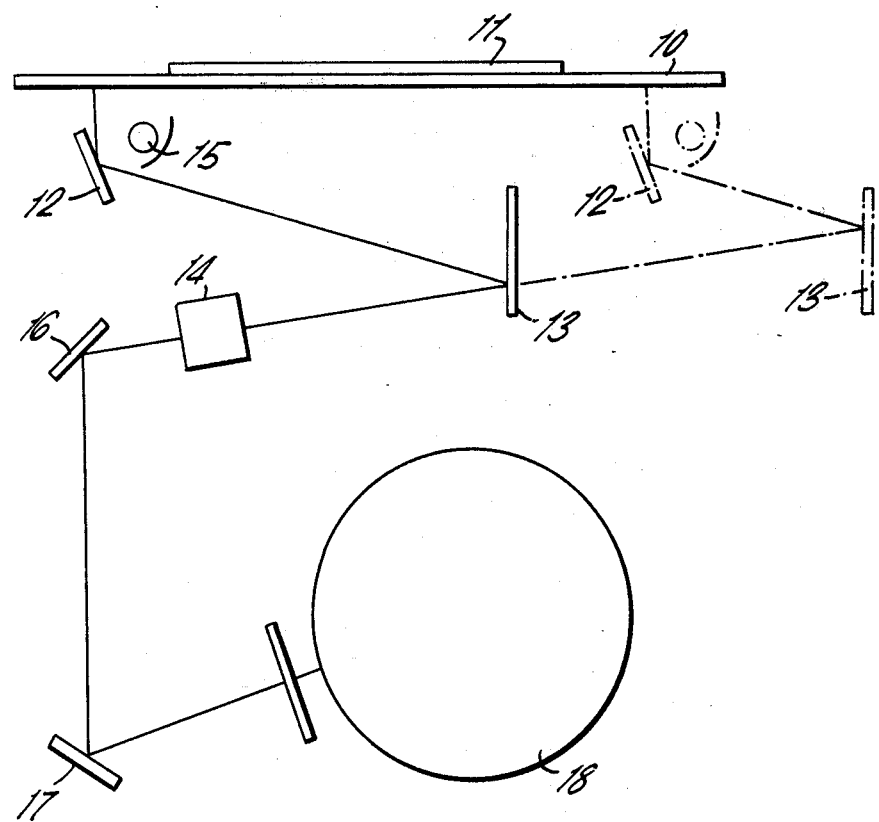
Figure 3:
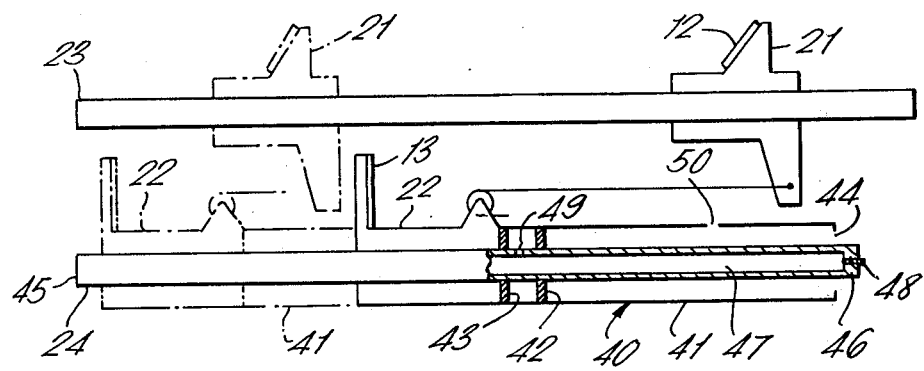
Figure 4:
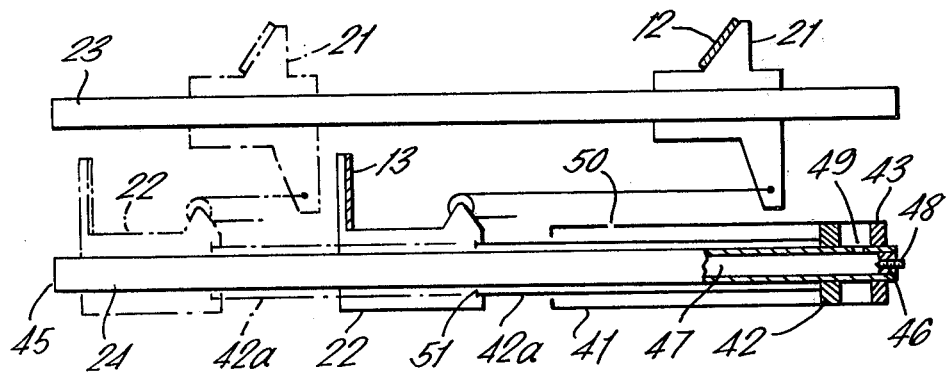

In order that the invention may be more readily understood, reference will now be made to the accompanying drawings, in which:

FIG. 1 shows schematically an embodiment of carriage drive assembly of a document scanning system of an electrostatographic copying machine in accordance with the present invention, FIG. 2 illustrates the optical arrangement of the scanning system shown in FIG. 1, FIG. 3 is a section through the dashpot of the embodiment shown in FIG. 1, and FIG. 4 is a part section of a second embodiment of the invention.

Referring to FIG. 1 there is shown a carriage drive assembly according to the invention applied to the document scanning system of an electrostatographic machine.

In the practice of electrostatography, various procedures may be followed. By way of illustration an electrostatographic image may be formed on a surface comprising a layer of photoconductive insulating material affixed to a conductive backing which is electrically charged uniformly to render it photosensitive, is then exposed to light from a given image so that an electrostatic latent image is formed thereon in accordance with the light image cast thereon, and finally is caused to be approached by a developer material, which may be fine colored particles carrying electric charge (referred to as toner), or it may be in liquid form, so that the developer material is attracted selectively to the electrostatic latent image, converting the latent image into a visible image. The powder or liquid may subsequently be transferred to a sheet of paper and suitably affixed to it so as to form a permanent print.

One method of exposing the photoconductive layer to light from a given image comprises scanning a lamp or lamps across a document to be copied, the image being projected onto the photoconductive surface by means of a suitable optical system. One system for achieving this is described in previously cited British Pat. Specification 995,413 (U.S. Pat. No. 3,062,109), where lamps which expose successive portions of a document to the photosensitive surface as they are scanned slowly across the document, are mounted on a carriage. At the end of the scanning stroke, the lamps are quickly returned to their start position.

The optical arrangement of the system shown in FIG. 1 is illustrated schematically in FIG. 2 and for clarity will be described there first, it being noted that the views in FIGS. 1 and 2 are taken from opposite sides of the system. A platen 10 is provided to support a document 11 which is to be copied. A scanning mirror system includes two movable mirrors 12 and 13 shown in their extreme left and right hand scanning positions (in FIG. 2) in solid and dashed outline respectively. The mirror 13 is arranged to move at half the speed and distance of the mirror 12 during scanning to maintain the optical distance constant between the document 11 and the lens 14. A tubular lamp 15 extending across the platen 10 parallel to the mirror 12 and in fixed relation to the latter moves with the mirror 12. The lamp 15 serves to illuminate the document through the platen 10 during scanning. An optical path extending from the platen 10 to the lens 14 continues beyond the lens to be reflected in sequence by mirrors 16 and 17 towards a photoreceptive drum 18. The photoreceptor may take other forms than a drum e.g., it may be in the form of a belt or a photoconductive copy sheet.

Referring now to FIG. 1, the mirrors 12 and 13 are mounted respectively on carriages 21 and 22. The carriage 21 runs on a guide rod, tube or the like 23 and the carriage 22 runs on a guide tube 24. A common guide bar 25 is provided at the opposite sides of the carriage to support and stabilize the carriages. The carriage 21 also carries the lamp 15.

In FIG. 1 the carriages are shown in their "start-of-scan" positions and during scanning they move from right to left.

The carriage 21 is driven via cable 26 by a capstan 27 mounted on a drive shaft 28 which is suitably the shaft carrying the photoreceptor drum. The movement of the carriage 22 is controlled by a single pulley and cable arrangement 29, 29', wherein the cable 29 extends between the carriage 21 and a fixed point on the machine from over the pulley which is mounted on the carriage 22. The cable 29 is held in tension by means of a secondary cable drive 30 from a smaller diameter capstan 31 attached to the capstan 27. As shown, the cable 30 passes over a pulley 32 and is connected at its end opposite the capstan 31 to the carriage 22. A tension spring 33 is interposed in the cable 30 for tensioning.

The drive capstan 27 may be operatively connected to the shaft 28 during scanning by means of a conventional clutch (not visible) actuated by a conventional solenoid (also not visible). During scanning a conventional spring (not visible) arranged within the capstan is loaded and provides the energy for returning the carriages to their start-of-scan positions when the clutch is disengaged. For convenience the return of the carriage to their start-of-scan positions is termed rescan. In its start-of-scan position the carriage 21 rests against an end stop or buffer 34 and at the end of the rescan stroke the carriage collides with the same end stop 34. In order to soften the collision and avoid damage to the system, particularly the lamp 15, which is delicate, especially when hot, the velocity of the carriage 21 when it reaches the end stop 34 is controlled in accordance with the present invention by a dashpot 40. In the embodiment illustrated the dashpot 40 acts on the half-speed carriage 22 and has reduced space requirements, but it could equally act directly on the full speed carriage 21. However, by virtue of their being connected as described above, direct control of the velocity of one carriage has the effect of also controlling the velocity of the other carriage. It may be seen that by acting on the slower carriage 22 there is a pulley ratio or amplification of two to one in velocity in controlling the faster carriage 21.

A dashpot 40 according to this invention suitable for use in the above-described scanning system will now be described in detail with reference to FIG. 3, which also illustrates schematically the scanning mirror carriages 21 and 22. The latter are shown in solid lines in their start-of-scan positions and in broken lines in their "end-of-scan" positions. The dashpot 40 comprises a cylinder 41 slidably mounted on the guide tube 24 and a piston 42 fixedly mounted on the fixed tube 24. The cylinder 41 is connected at one end 43 of the carriage 22, the end 43 being closed and sealingly engaging the tube 24. The other end 44 of the cylinder is preferably open. The piston 42 is annular in form and is secured to the tube 24 in a position close to that of the end wall 43 of the cylinder in the start-of-scan position of the carriage 22, i.e., when the carriage 21 is abutting the buffer 34 (FIG. 1). The guide tube 24 is closed at both ends by end walls 45 and 46 defining a chamber 47. One of these walls, the wall 46 as shown, has therein an aperture 48 by which the chamber 47 is vented to atmosphere. This aperture 48 is advantageously defined by an adjustable bleed jet screwed into the end wall 46.

A further aperture 49 is provided in the tubular wall of the guide tube 24 intermediate the piston 42 and the closed cylinder end wall 43 and adjacent the piston. As shown, this aperture 49, which is larger than the aperture 48, is arranged beyond the end position of the piston 42 relative to the cylinder end wall 43 defined by the position of the cylinder 41 as shown in solid lines in FIG. 3.

An additional aperture 50 is provided in the cylinder wall 41. This aperture 50 is preferably of sufficient size to avoid the dashpot having any damping effect until this aperture has been covered by the piston 42, as described more fully below.

At the start of a copying cycle (the carriages being in their start-of-scan positions illustrated), the capstan 27 is clutched in and drives the carriages from right to left in FIG. 1 to scan a document on the platen 10. During scanning the carriages are driven slowly in a controlled constant speed manner, and at this slow speed, the dashpot does not materially adversely affect their motion.

At the end of the scanning stroke, the clutch is disengaged and the carriages 21 and 22 are driven in the opposite direction by the spring attached to the capstan 27. Initially, the carriages accelerate under the influence of the spring, during which time the venting area of the aperture 50 is sufficient to at least substantially avoid damping of the movement of the carriages. As the aperture 50 is passed and closed by the piston 42, the damping effect of the dashpot takes over and the carriages are decelerated in a controlled manner. By suitable choice of the sizes (and/or number) of the apertures 48 and 49, when the cylinder reaches its end position illustrated, the carriages will have decelerated sufficiently to avoid damage to the system as the carriage 21 strikes the buffer 34, while the provision of the chamber 47 permits the cylinder end wall 43 and the piston 42 to be closely disposed at the end of the damping stroke without impairing the damping effect of the dashpot. The location of the aperture 49 beyond the end position of the cylinder end wall 43 at the end of the damping stroke ensures that the carriages will always reach their end positions since they will still have a finite velocity when the carriage 21 strikes the stop 34.

In a specific form of the above embodiment, the cylinder 41 is 9 ¼ inches long and the "stroke" of the piston (relative to the moving cylinder) is 7 ½ inches. The cylinder 41 has an effective volume of 8 cubic inches and the chamber 47 has a volume of 1 cubic inch. The aperture 49 has a diameter of 0.2 inches and the size of the aperture 48 may be varied between effective diameters of 0.02 and 0.08 inches. A rescan time of 500 milliseconds may be obtained with the carriage 21 reaching a maximum velocity of 50 inches/second and having a velocity as low as 4 inches/second as it strikes the end stop 34.

FIG. 4 is a view like that of FIG. 3 of a further embodiment in which the cylinder 41 is fixed, its end 43 remote from the carriage 22 being closed, and the piston 42 is slidably mounted over the tube 24, the aperture 49 being arranged adjacent to the fixed cylinder end wall 43. The piston 42 is connected to the carriage 22 by a tubular member or piston "rod" 42a which slides over the guide tube 24 and which may be constructed as an integral part of the carriage 22. However, preferably the connection between the piston connector 42a and the carriage 22 is flexible as shown at 51 to avoid the need for precise alignment of the cylinder bore with the carriage bearings. The end of the cylinder 41 adjacent the carriage 22 may, as shown, be open.

While specific embodiments of the invention have been described above, it will be appreciated that various modifications may be made without departing from the scope of the invention as defined in the appended claims. For example, while in the embodiments described above the cylinders are of such a length that the piston always remains within the cylinder, the piston may be disposed outside the cylinder at the end of the scanning stroke in which case no damping will be effected until the piston enters the cylinder during rescan. Further, while the scanning system described and illustrated employ two carriages, the invention may equally be applied to a system in which a different number of carriages is employed. Also, if it is found necessary or desirable for increasing the deceleration control exercised by the dashpot, a plurality of relatively axially disposed apertures may be provided in the side wall of the cylinder (so that all are successively covered by the piston during the damping stroke) in any of the ways envisaged in our aforesaid copending application.

What is claimed is:

1. In a photocopying machine with an optical scanning carriage mounted for movement on a tubular mounting member and a pneumatic dashpot for said carriage the improvement comprising:
   a cylinder and mateing piston both mounted on said tubular member, one slidably and the other in fixed relation thereto,
   said tubular member defining a pneumatic chamber vented to atmosphere by a venting aperture therein;
   said cylinder having a closed end wall;
   said piston having a piston air stroke relative to said cylinder driven by said movement of said carriage extending to an end position spaced from said cylinder end wall;
   said end position of said piston corresponding to a defined end position of movement of said optical scanning carriage on said tubular member; and
   said tubular member having a second aperture communicating between said cylinder and said pneumatic chamber,
   said second aperture being located intermediate said cylinder end wall and said piston for said entire air stroke.

2. The photocopying machine of claim 1, wherein said second aperture is at least as large as said venting aperture for the compression of air into said pneumatic chamber through said second aperture by said carriage movement.

3. The photocopying machine of claim 1, wherein said venting aperture is provided on one end of said tubular member and said tubular member extends beyond said cylinder.

4. The photocopying machine of claim 3, wherein said venting aperture is adjustable.

5. The photocopying machine of claim 1 further including a third aperture intermediately through the side wall of said cylinder to atmosphere sufficiently large to prevent significant pneumatic damping by said dashpot until said third aperture has been passed by said piston in its air stroke relative to said cylinder.

6. The photocopying machine of claim 1, wherein said pneumatic chamber in said tubular member has a substantially greater volume than the volume of said cylinder between said cylinder end wall and said end position of said piston, but wherein the effective volume of said cylinder for said piston air stroke is substantially greater than the volume of said pneumatic chamber in said tubular member.

7. The photocopying machine of claim 1, wherein said piston is fixed to said tubular member and said cylinder is connected to and movable with said carriage.

8. The photocopying member of claim 1, wherein said cylinder is fixed to said tubular member and said piston is connected to and movable with said carriage.

9. The photocopying machine of claim 1, wherein a second optical scanning carriage is connected to said first optical scanning carriage by drive means providing a different rate of movement for said second carriage relative to said first carriage, and wherein said different movement of said second carriage is also damped by said same pneumatic dashpot associated only with said first carriage.

10. The photocopying machine of claim 9, wherein said drive means moves said second carriage at a substantially lower rate of movement than said first carriage.

* * * * *